_ _

United States Patent [19]

Dietz et al.

[11] Patent Number: 5,532,522
[45] Date of Patent: Jul. 2, 1996

[54] PRINTED CIRCUIT READER/EXCITER COIL FOR VEHICLE SECURITY SYSTEM

[75] Inventors: George J. Dietz, Greenfield; Randall E. Hammer, Greendale, both of Wis.; Stephen M. Basche, Lindenhurst, Ill.; Kevin J. Hawes, Greentown, Ind.

[73] Assignee: Delco Electronics Corp., Kokomo, Ind.

[21] Appl. No.: 254,717

[22] Filed: Jun. 6, 1994

[51] Int. Cl.$^6$ ............................................ B60R 25/00
[52] U.S. Cl. .................. 307/10.5; 180/287; 340/825.31
[58] Field of Search ............................. 307/9.1–10.6; 361/749, 807, 823; 180/287, 289; 70/237, 277, 278, 252, 370; 340/425.5, 426, 825.3–825.32, 825.34, 825.44, 825.69, 825.72

[56] References Cited

U.S. PATENT DOCUMENTS

| | | | |
|---|---|---|---|
| 4,738,334 | 4/1988 | Weishaupt | 307/10.5 |
| 4,918,955 | 4/1990 | Kimura et al. | 70/277 |
| 4,980,680 | 12/1990 | Knoll et al. | 307/10.5 |
| 5,023,605 | 6/1991 | McColl | 307/10.5 |
| 5,111,199 | 5/1992 | Tomoda et al. | 340/825.72 |
| 5,311,757 | 5/1994 | Spahn | 70/278 |
| 5,373,718 | 12/1994 | Schwerdt et al. | 70/278 |
| 5,424,586 | 6/1995 | Hattori et al. | 307/10.1 |
| 5,461,386 | 10/1995 | Knebelkamp | 340/852.31 |

*Primary Examiner*—William M. Shoop, Jr.
*Assistant Examiner*—Richard T. Elms
*Attorney, Agent, or Firm*—Mark A. Navarre

[57] ABSTRACT

A transponder embedded in a key and a reader/exciter coil surrounding the lock cylinder are inductively linked to provide energization to the transponder, causing it to emit a digital identification code. A control circuit associated with the coil supplies energizing coil current and analyzes the emitted code to verify the authenticity of the key. The coil and control circuit are contained in a planar multi-layer hardboard printed circuit having high circuit integrity and being very thin for accommodation in the lock assembly. Alternatively, the coil and control circuit are contained in a flexible printed circuit. There the coil includes two opposed elongated legs which are positioned on opposite sides of the lock cylinder and folded in a way to conform to the cylinder surface, forming in effect a very thin cylindrical coil. An extension on the printed circuit form a path to the control circuit which is remote from the cylinder.

6 Claims, 2 Drawing Sheets

PRINTED CIRCUIT READER/EXCITER COIL FOR VEHICLE SECURITY SYSTEM

FIELD OF THE INVENTION

This invention relates to vehicle security systems and particularly to a reader/exciter coil associated with a lock cylinder for use with a transponder.

BACKGROUND OF THE INVENTION

It has previously been proposed to improve the security of a vehicle by incorporating in an ignition key an electronically readable code which verifies that the key is authentic, and preventing vehicle operation when the correct code is absent. Thus a vehicle theft cannot be accomplished by merely copying the key shape.

The code device incorporated in the key is a miniature transponder which is well known as an implant in animals used for identification of individual animals. The implant comprises windings on a ferrite core to serve as an antenna, and an electronic circuit for transmitting serial data comprising the identification code. An external coil positioned to inductively couple with the antenna irradiates an AC signal of typically 125 kHz to energize the transponder, providing sufficient power for its operation. The serial data signal emitted by the transponder is received by the external coil and then analyzed by an associated electronic circuit to determine the code.

The usage of this technology for vehicle ignition keys has been carried out by a wire coil wound on a bobbin which surrounds the ignition lock cylinder, and the coil terminations are connected to an electronic circuit for supplying the AC power to the coil to excite the transponder and for reading the code emitted by the transponder. This implementation of the reader/exciter coil leads to two problems: first, the shape and bulk of the coil and bobbin is not always compatible with the space available adjacent the lock cylinder; and second, the connection of the coil terminations to the electronic circuit is a source of electrical faults.

SUMMARY OF THE INVENTION

It is therefore an object of the invention to reduce the size of the coil to facilitate its addition to the lock mechanism. Another object is to adapt coil shapes to available space adjacent the lock cylinder. Still another object is to eliminate the connections of coil termination to associated circuitry.

The invention is carried out by a printed circuit assembly having a reader/exciter coil on one part of the printed circuit and the necessary electronics on another part of the printed circuit so that the circuit traces connecting the coil and the electronics are integral with the coil and the electronic circuit. By using a printed circuit coil the bobbin is eliminated and the space required is much smaller than that used by the conventional coil and bobbin. Moreover, two implementations of the printed circuit coil are provided. A multi-layer hardboard circuit is well adapted to fit in a small space transverse to the lock cylinder axis, and a flexible circuit is adapted to assume a cylindrical shape to fit in a small cylindrical gap surrounding the lock cylinder surface.

The hardboard circuit comprises a planar multi-layer circuit board having a spiral trace in each layer interconnected to afford additive magnetic fields when energized, the traces surrounding an aperture which fits over the lock cylinder. Two pathways from the coil traces extend to an outboard portion of the circuit board to serve as input conductors of the electronic circuit which preferably comprises one or more integrated circuits.

The flexible circuit is formed from a blank comprising a thin flexible substrate having an elongated rectangular portion carrying the coil traces on each side and having a central slit along a longitudinal axis. The coil traces have elongated leg portions running parallel to the slit and interconnected at each end by end portions. The flexible circuit is applied to the cylinder by folding the coil along the longitudinal axis, spreading the legs apart, and wrapping the legs around the lock cylinder to conform to its surface, thereby taking up very little space. The end portions of the coil and any extra length of the rectangular portion are folded back against the conforming part of the legs. An extension of the flexible circuit carries integral traces from the coil to the electronic circuit.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
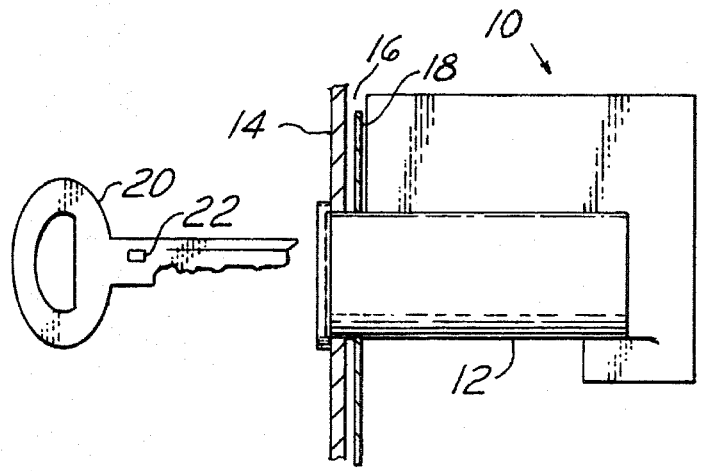
FIG. 1 is a cross-sectional view of a printed hardboard reader/exciter circuit in a lock assembly with a key according to one embodiment of the invention.
Figure 2:
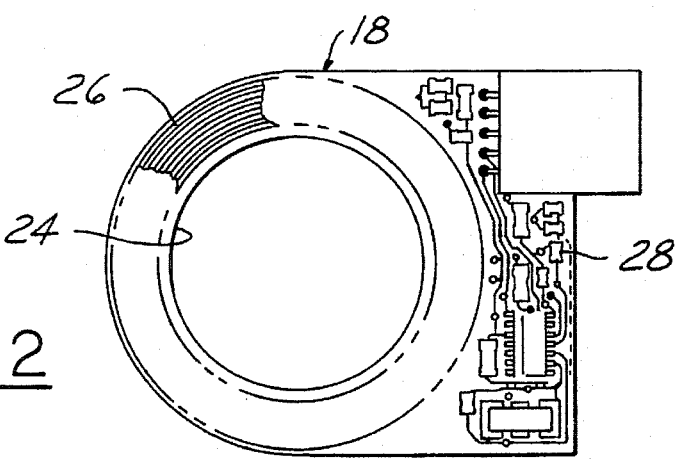
FIG. 2 a front view of the printed circuit of FIG. 1.

Referring to FIGS. 1 and 2, a vehicle ignition lock assembly 10 includes a lock cylinder 12 mounted in a panel 14, which may be part of the vehicle steering column or of the instrument panel. A narrow space 16 surrounding the cylinder 12 and between a portion of the lock assembly and the panel 14 contains a printed circuit board 18. A key 20 for operating the lock cylinder 12 has an embedded transponder 22. Such a transponder is well known and includes an antenna coil wound on a ferrite core, and a circuit for sending a digital code when energized.

The printed circuit board 18 is a multi-layer hardboard and has an aperture 24 for receiving the lock cylinder 12. A coil 26 comprises interconnected spiral traces in each layer of the circuit board surrounding the aperture, the spiral direction in each layer being chosen for additive effect. The circuit board has, for example, four layers and 30 coil turns on each layer, and is about 0.031 inch thick. Additional layers and thus more total turns can be employed without significant increase in thickness of the hardboard printed circuit. Outboard of the coil, electronic circuitry 28 which may include a microprocessor and an ASIC (application specific integrated circuit) is contained on the circuit board 18 and is integrally connected to the coil by a pair of terminal traces (not shown) which extend from the coil, so that soldered connections are not used. The electronic circuitry includes a capacitor for tuning the coil for operation at the desired frequency.

In operation, the electronic circuitry 28 excites the coil 26 with a 125 kHz signal to produce a magnetic field of that frequency within the coil. When the key 20 is inserted into the lock cylinder 12, the transponder 22 enters the magnetic field and is energized by the field. The circuit within the transponder 22 then modulates the magnetic field to impress the digital code on the field. This modulation is sensed by the coil and thus by the electronic circuitry which decodes the digital signal and compares it with a stored code. If the decoded signal matches the stored code a signal is issued to enable operation of the vehicle starter and/or fuel injection circuits.

The printed circuit assembly has the advantage over wire wound coils and electronics connected to such coils by soldered connections in that a much smaller gap between the lock assembly and the panel is required for the printed circuit, and the solder joints and attendant unreliability is eliminated. In addition, the printed coil can be more precisely reproduced in high volume production than a wire-wound coil, thus permitting optimum tuning of the circuit and repeatability from part to part. Another advantage is that because there is minimal risk of open or short circuits in the trace coil, it is not necessary to use additional circuitry to monitor coil integrity as is often done with wire coils. Finally, the printed circuit assembly simplifies the manufacturing process since the part count is reduced by eliminating separate coils and a bobbin.

Figure 3:
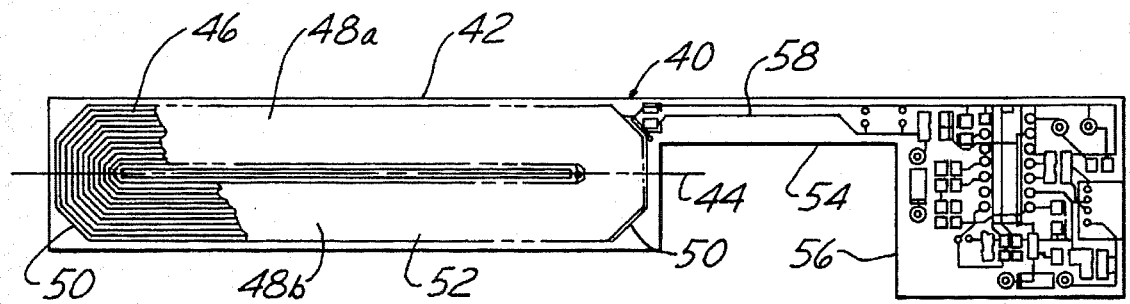
FIG. 3 is a plan view of flexible printed reader/exciter circuit according to another embodiment of the invention, with the circuit in planar form.

The second embodiment of the printed circuit assembly begins as a planar flexible printed circuit 40 or blank, shown in FIG. 3. An elongated rectangular portion 42 defining a longitudinal axis 44 contains a coil 46 having traces including elongated linear legs 48*a* and 48*b* on either side of and parallel to the axis 44, and end portions 50 interconnecting the traces on the linear legs. The traces are on both sides of the printed circuit substrate and interconnected by vias through the substrate. A slit 52 in the substrate along the axis 44 and coextensive with the linear legs separates the linear legs. The circuit includes a narrow runner 54 extending from one end of the rectangular portion 42 to an electronic circuit portion 56. Traces 58 integral with the coil 46 and the electronic circuit extend along the runner 54.

Figure 4:
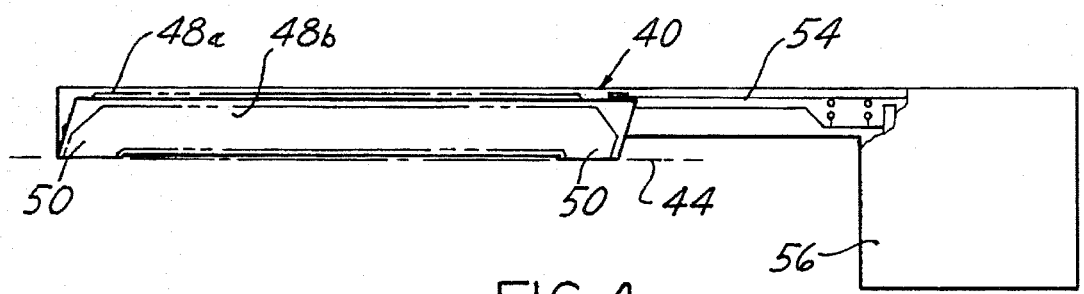
FIGS. 4 and 5 are views of the printed circuit of FIG. 3 in various stages of forming to attain a cylindrical coil shape.
Figure 5:
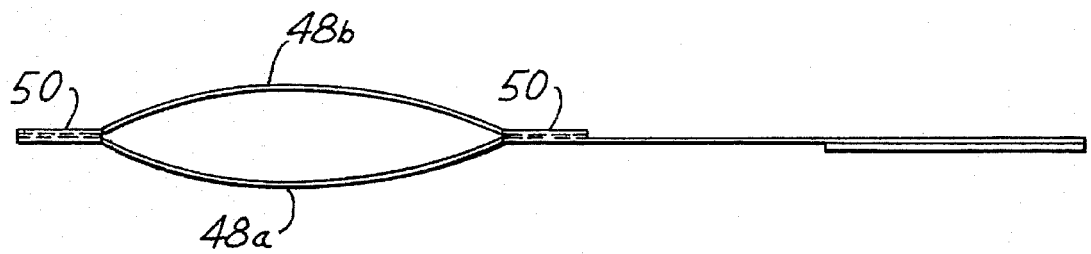
Figure 6:
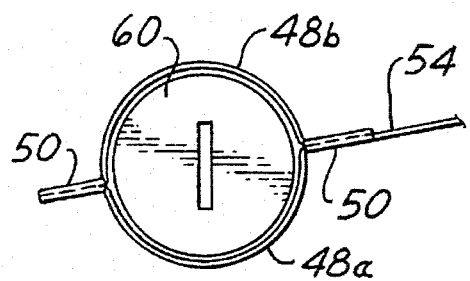
FIGS. 6 and 7 are end views of the printed circuit of FIG. 3 wrapped around a lock cylinder.
Figure 7:
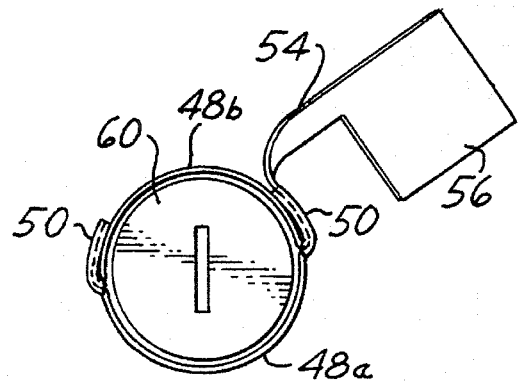

There are a number of ways to fold the rectangular circuit portion 42 to arrange the legs 48*a* and 48*b* on either side of the lock cylinder to conform to the cylinder surface; one way is described here. FIG. 4 shows the end portions folded along the longitudinal axis 44 to superimpose the two legs. Then the legs 48*a* and 48*b* are spread apart (FIG. 5) to fit around opposite sides of the lock cylinder 60 (FIG. 6). Each leg then assumes a semi-cylindrical form and together comprise a cylindrical coil. Each end portion 50 and any extra length in the legs is folded against the cylindrical coil as shown in FIG. 7. The ends may be taped in place. The runner is then directed in a desired path to place the circuit portion 56 in a convenient location. Thus the folded flexible coil results in a very thin cylindrical coil conforming to the cylinder lock and having the number of windings which are formed by printed circuit technology on the planar blank. The coils are directly connected without solder joints to the electronic circuitry which resides on the same printed circuit. Other ways of folding the rectangular circuit portion may be devised by changing the order of some of the steps recited here, or by reversing the direction of one or more folds; the end result is electrically the same. The operation and the advantages are the same as recited above for the hardboard printed circuit, but it is adapted to fit in a differently shaped space adjacent the lock cylinder.

The embodiments of the invention in which an exclusive property or privilege is claimed are defined as follows:

1. A security system for controlling access to vehicle operation including a lock cylinder adapted to control access, a key for insertion into the lock cylinder, the key containing a transponder carrying an identification code, a reader/exciter coil, and an electronic control circuit for communicating with the transponder via the reader/exciter coil for verifying the identification code, the improvement wherein:

the electronic control circuit and reader/exciter coil are formed on a single printed circuit board, the electronic control circuit having components mounted on the printed circuit board and electrically interconnected by conductor traces formed on at least one planar surface of said printed circuit board, and the reader/exciter coil being defined by extensions of said conductor traces disposed in a spiral pattern surrounding the lock cylinder, thereby eliminating a connector interface between said reader/exciter coil and said electronic control circuit.

2. The improvement of claim 1, wherein the printed circuit board is a multi-layer hardboard circuit having an aperture for receiving the lock cylinder; and the conductor traces defining the reader/exciter coil surround the aperture.

3. A security system for controlling access to vehicle operation including a lock cylinder adapted to control access, a key for insertion into the lock cylinder, the key containing a transponder carrying an identification code, a reader/exciter coil, and an electronic control circuit for communicating with the transponder via the reader/exciter coil for verifying the identification code, the improvement wherein:

the electronic control circuit and reader/exciter coil are formed on a single flexible substrate, the electronic control circuit having components mounted on the flexible substrate and electrically interconnected by conductor traces formed on at least one major surface of said flexible substrate, and the reader/exciter coil being defined by extensions of said conductor traces disposed in a spiral pattern surrounding the lock cylinder, thereby eliminating a connector interface between said reader/exciter coil and said electronic control circuit, said reader/exciter coil being coaxial with said lock cylinder.

4. The improvement as defined in claim 3 wherein:

the flexible substrate carries conductor traces on each of its major surfaces and includes vias interconnecting the traces through the flexible substrate; and the coil is cylindrical and conforms to the lock cylinder.

5. The improvement as defined in claim 3 wherein the flexible substrate is formed from a blank having two elongated legs on opposite sides of and parallel to a center line, the legs being joined by connecting portions at either end and carrying the conductor traces which define said coil, the blank being folded on the center line and the legs spread apart to form a cylindrical coil which is disposed around the lock cylinder.

6. The improvement as defined in claim 5 wherein the legs conform to the cylinder, and the ends of the legs and the respective connecting portions are folded against the cylindrical coil.

* * * * *